US010344825B2

(12) United States Patent
Wigsten (10) Patent No.: US 10,344,825 B2
(45) Date of Patent: Jul. 9, 2019

(54) SPRING LOADED PLANT GEAR ASSEMBLY

(71) Applicant: BorgWarner Inc., Auburn Hills, MI (US)

(72) Inventor: Mark M. Wigsten, Lansing, NY (US)

(73) Assignee: BorgWarner Inc., Auburn Hills, MI (US)

(*) Notice: Subject to any disclaimer, the term of this patent is extended or adjusted under 35 U.S.C. 154(b) by 175 days.

(21) Appl. No.: 15/162,733

(22) Filed: May 24, 2016

(65) Prior Publication Data

US 2016/0348760 A1 Dec. 1, 2016

Related U.S. Application Data

(60) Provisional application No. 62/167,970, filed on May 29, 2015.

(51) Int. Cl.
| | |
|---|---|
| *F01L 1/352* | (2006.01) |
| *F16H 1/28* | (2006.01) |
| *F16H 57/08* | (2006.01) |
| *F16H 57/12* | (2006.01) |
| *F16H 57/02* | (2012.01) |

(52) U.S. Cl.
CPC ............ *F16H 1/2863* (2013.01); *F01L 1/352* (2013.01); *F01L 2820/032* (2013.01); *F16H 1/2836* (2013.01); *F16H 57/082* (2013.01); *F16H 2057/02082* (2013.01); *F16H 2057/126* (2013.01); *F16H 2057/127* (2013.01)

(58) Field of Classification Search
CPC ... F01L 1/352; F01L 2820/032; F16H 1/2863; F16H 57/082; F16H 2057/02082; F16H 2057/126; F16H 2057/127

USPC ........ 475/331, 337; 123/90.15, 90.16, 90.17, 123/90.11
See application file for complete search history.

(56) References Cited

U.S. PATENT DOCUMENTS

| | | | | |
|---|---|---|---|---|
| 2,959,073 | A | * 11/1960 | Doerfer ................. | F16B 21/186 411/517 |
| 3,081,648 | A | * 3/1963 | Duer ........................ | F16H 1/28 475/342 |

(Continued)

FOREIGN PATENT DOCUMENTS

| | | |
|---|---|---|
| JP | 3-48045 | 3/1991 |
| JP | 8-170695 | 7/1996 |

(Continued)

*Primary Examiner* — Roger L Pang
(74) *Attorney, Agent, or Firm* — Brown & Michaels, PC (57) ABSTRACT

A split ring planetary drive for an engine or use with an electric phaser. The split ring planetary drive includes a sun gear, a plurality of planet gears, a spring ring gear, a camshaft ring gear, and at least one spring. The sun gear has teeth and is driven to rotate around a sun axis. The plurality of planet gears are arranged around the sun gear with each planet gear comprised of planet teeth maintaining the planet gear in meshing engagement with the sun gear teeth. The sprocket ring gear has teeth and is driven by a crankshaft. The camshaft ring gear has teeth is rotatable with a camshaft. The teeth of the sprocket and camshaft ring gears maintain the ring gears in meshing engagement with each of the planet gears. The spring biases the planet gear teeth into meshing engagement with the sprocket and camshaft ring gear teeth.

8 Claims, 10 Drawing Sheets

(56) References Cited

U.S. PATENT DOCUMENTS

| | | | |
|---|---|---|---|
| 3,292,460 A * | 12/1966 | Fritsch | F16H 1/2836 475/347 |
| 3,978,829 A * | 9/1976 | Takahashi | F01L 1/352 123/90.15 |
| 4,850,247 A * | 7/1989 | Yu | F16H 1/46 475/342 |
| 4,986,802 A * | 1/1991 | Scoville | F16H 1/2836 475/334 |
| 5,336,137 A * | 8/1994 | Kawakita | B60N 2/2251 297/362 |
| 5,409,431 A | 4/1995 | Vranish | |
| 5,540,630 A | 7/1996 | Vranish | |
| 6,543,399 B2 | 4/2003 | Heer | |
| 7,261,667 B2 | 8/2007 | Berger | |
| 7,297,086 B2 | 11/2007 | Fox | |
| 7,506,623 B2 | 3/2009 | Schafer et al. | |
| 7,959,537 B2 | 6/2011 | Suguira et al. | |
| 8,192,323 B2 | 6/2012 | Fox | |
| 8,313,411 B2 | 11/2012 | Schafer | |
| 9,810,109 B2 * | 11/2017 | Pluta | F01L 1/352 |
| 2004/0206322 A1 * | 10/2004 | Meintschel | F01L 1/022 123/90.17 |
| 2006/0236965 A1 | 10/2006 | Schafer et al. | |
| 2007/0179011 A1 | 8/2007 | Choi et al. | |
| 2014/0148301 A1 | 5/2014 | Westholt et al. | |
| 2014/0184002 A1 | 7/2014 | Levin et al. | |
| 2016/0327124 A1 * | 11/2016 | McCloy | F16H 1/2863 |
| 2018/0073598 A1 * | 3/2018 | Pluta | F16H 1/2863 |

FOREIGN PATENT DOCUMENTS

| | | |
|---|---|---|
| WO | 03056141 | 7/2003 |
| WO | 2010018821 | 2/2010 |
| WO | 2013083188 | 6/2013 |
| WO | 2014092963 | 6/2014 |

* cited by examiner

SPRING LOADED PLANT GEAR ASSEMBLY

BACKGROUND OF THE INVENTION

Field of the Invention

The invention pertains to the field of planet gear assemblies. More particularly, the invention pertains to a spring loaded planet gear assembly.

Description of Related Art

Variable cam timing or "VCT" is a process that refers to controlling and varying, when desirable, the angular relationship (the "phase") between the drive shaft and one or more camshafts, which control the engine's intake and exhaust valves. In a closed loop VCT system, the system measures the angular displacement, or phase angle, of a camshaft relative to the crankshaft to which it is operatively connected, and then alters the phase angle to adjust various engine characteristics in response to demands for either an increase or a reduction in power. Typically, there is a feedback loop in which the desired values of such engine characteristics are measured against their existing values, and changes are effected inside the engine in response to any variances. To accomplish this, modern automobiles usually have one or more Electronic Control Units (ECU), which constantly analyze data fed into them from various parts of the engine or from other parts of the automobile, such as, for example, exhaust gas sensors, pressure sensors, and temperature sensors. A control signal is then emitted in response to such data. For example, with regard to VCT systems, as changes occur in engine or external conditions, the angular displacement between the camshaft and the crankshaft is adjusted accordingly.

A VCT system includes a cam phasing control device, sometimes referred to as a phaser, control valves, control valve actuators, and control circuitry. An electric phaser (e-phaser) is driven by an electric motor to control and vary the angular relationship between the drive shaft and one or more camshafts. In response to input signals, the electric phaser adjusts the camshaft to either advance or retard engine timing.

These systems have a high ratio gear train and can phase the camshaft relative to the crankshaft by means of a motor spinning at the same speed as the camshaft. As the motor spins faster than the camshaft the phaser will phase the camshaft relative to the crank shaft in one direction and as the motor slows down, the camshaft to crank shaft phase will move in the opposite direction.

U.S. Patent Application Publication No. 2007/0179011, by Choi et al., entitled "Variable Gear Ratio Steering Apparatus for Automobiles" and published Aug. 2, 2007, discloses a variable gear ratio steering apparatus including an input shaft connected to a steering wheel, a sun gear coaxially formed with the input shaft while enclosing the input shaft, a first pair of planet gears externally meshing with the sun gear, a second pair of planet gears externally meshing with the sun gear, a first carrier coupled to the input shaft while connecting the first pair of planet gears, a second carrier adapted to rotate relative to the input shaft while connecting the second pair of planet gears, a ring gear internally meshing with the first and second pairs of planet gears, and an input shaft connected to the ring gear. The second carrier is inserted into the first carrier while being supported by a compression means so that the second carrier can rotate relative to the input shaft to reduce backlash.

WO 2014/092963, by Showalter, entitled "Split Ring Gear Planetary Cam Phaser" and published Jun. 19, 2014, discloses a cam phaser for dynamically adjusting a rotational relationship of a camshaft of an internal combustion engine with respect to an engine crankshaft. The cam phaser can include a planetary gear system having a split ring gear, including a sprocket ring gear to be driven by the engine crankshaft through an endless loop power transmission member and a camshaft ring gear connectable for rotation with the camshaft. A sun gear can be located concentric with the split ring gear, and a number of planet gears can be in meshing engagement between the sun gear and the split ring gear. The camshaft ring gear can have a different number of teeth, greater or lesser, than the sprocket ring gear by a value corresponding to a multiple of the number of planet gears to provide tooth alignment at an engagement position of each of the planet gears.

SUMMARY OF THE INVENTION

A split ring planetary drive for an engine or use with an electric phaser. The split ring planetary drive includes a sun gear, a plurality of planet gears, a sprocket ring gear, a camshaft ring gear, and at least one spring. The sun gear is driven to rotate around a sun axis, the sun gear is comprised of a plurality of sun gear teeth. The plurality of planet gears are arranged around the sun gear with each planet gear comprised of a plurality of planet teeth maintaining the planet gear in meshing engagement with the sun gear teeth. The sprocket ring gear is driven by a crankshaft and is comprised of a plurality of sprocket ring gear teeth maintaining the sprocket ring gear in meshing engagement with the planet gear teeth of each of the planet gears. The camshaft ring gear is rotatable with a camshaft and is comprised of a plurality of camshaft ring gear teeth maintaining the camshaft ring gear in meshing engagement with the planet gear teeth of each of the planet gears. The spring biases the plurality of planet teeth into meshing engagement with the sprocket ring gear teeth and the camshaft ring gear teeth.

In one embodiment, the spring may act as a planet carrier and couples the plurality of planet gears together through engagement of the at least one spring with pins in which the plurality of planet gears rotate on.

In an alternate embodiment, the split ring planetary drive may include a rigid planet gear carrier that couples the plurality of planet gears through pins, where each of the planet gears are rotatable about a pin. The planet gear carrier includes radially extending slots for receiving pins, where the pins are radially moveable within the slots. In this embodiment, the spring may be present between the planet carrier and the plurality of planet gears. Alternatively, the spring is adjacent just the planet carrier.

In another embodiment the split ring gear drive is a single ring gear drive.

The split ring gear drive and the single ring gear drive may be used with an electric phaser with an electric motor. The electric phaser can dynamically adjust a rotational relationship of a camshaft of an internal combustion engine with respect to an engine crankshaft.

DETAILED DESCRIPTION OF THE INVENTION

An electric phaser dynamically adjusts the rotational relationship of the camshaft of an internal combustion engine with respect to the engine crankshaft. The electric phaser includes a planetary drive system driven by an electric motor. The planetary drive system may be a split ring planetary drive system with a sprocket ring gear driven by the engine crankshaft and a camshaft ring gear concentric with the sun gear and connected to the camshaft. The planetary drive system may include a centrally-located sun gear, and a plurality of planet gears engaging the sun gear. In one embodiment a rigid planet carrier may be present to connect the planet gears together. In other embodiments, a non-rigid carrier may be used to connect planet gears together. The planet gears are loaded with respect to each other to reduce backlash in the planetary drive system. The electric motor is preferably a brushless DC motor.

Although backlash and noise-vibration-harshness (NVH) can be significantly reduced by using highly precise ground gears, this generally makes manufacture of the gears prohibitively expensive. Gear loading is used herein to reduce the backlash and NVH with less precise gears that are much more inexpensive to produce.

One of the main differences between a single ring planetary system and a split ring planetary system is the significance of the backlash between the rings and the planets in a split ring planetary system. True circumferential loading is capable of taking out all of the backlash in a single ring planetary drive except for the bearing clearance in the planet shaft to planet gear. In contrast, true circumferential loading is capable of taking out most of the backlash in a split ring planetary drive, but not all, because the tooth widths are not perfectly matched between the two ring gears.

There is a tooth count difference between the camshaft ring gear and the sprocket ring gear. The camshaft ring gear moves at a slightly different speed than the sprocket ring gear due to the tooth difference when the sun gear rotates at a different speed than the camshaft.

In some embodiments, an electric motor is connected to the sun gear to drive the sun gear in relation to the planet gears. When the electric motor rotates the sun gear at the same speed as the sprocket ring gear, a constant phase position is maintained between the crankshaft and the camshaft. Under these conditions, the planetary gear assembly rotates as a unit with no relative movement between the sun gear and the planet gears or between the planet gears and the ring gears, which minimizes frictional losses. Adjusting the electric motor speed with respect to the sprocket ring gear/camshaft ring gear/camshaft adjusts the phase of the camshaft with respect to the crankshaft. When the electric motor rotates the sun gear at a speed faster than the speed of the camshaft, the phaser is moving in the retarding direction. When the electric motor rotates the sun gear at a speed slower than the speed of the camshaft, the phaser is moving in the advancing direction.

The sprocket ring gear, the camshaft ring gear, the planet gears, and the sun gear are arranged in a planetary gear drive connection preferably having a high numerical gear ratio to allow accurate phasing angle adjustment with a relatively low driving torque requirement for the electric motor. The sprocket ring gear is preferably driven by the engine crankshaft through a sprocket and an endless loop power transmission chain, and the camshaft ring gear is preferably connected to rotate with the camshaft.

The planet gears may be loaded in any of a number of different ways with respect to each other to reduce backlash in the planetary drive system.

One solution to reduce backlash between the ring gear and planet gears is to add springs acting on the planet gears or planet pins in the radial direction. The spring(s) can take the form of large snap rings or C-clips that are compressed at assembly and put an outward force on the planet gears. The planet gears can be coupled to a planet carrier via pins. The pins may be located in radial slots in a rigid planet carrier. Alternatively, the springs themselves can act as the carrier in coupling the planet gears together. Any out of roundness of the ring gears and planet gears will simply cause the gap between the two compliant gears to vary slightly without binding. The spring rate can be adjusted so the added drag can be minimized and still provide an effective backlash and noise mitigation solution.

Figure 1:
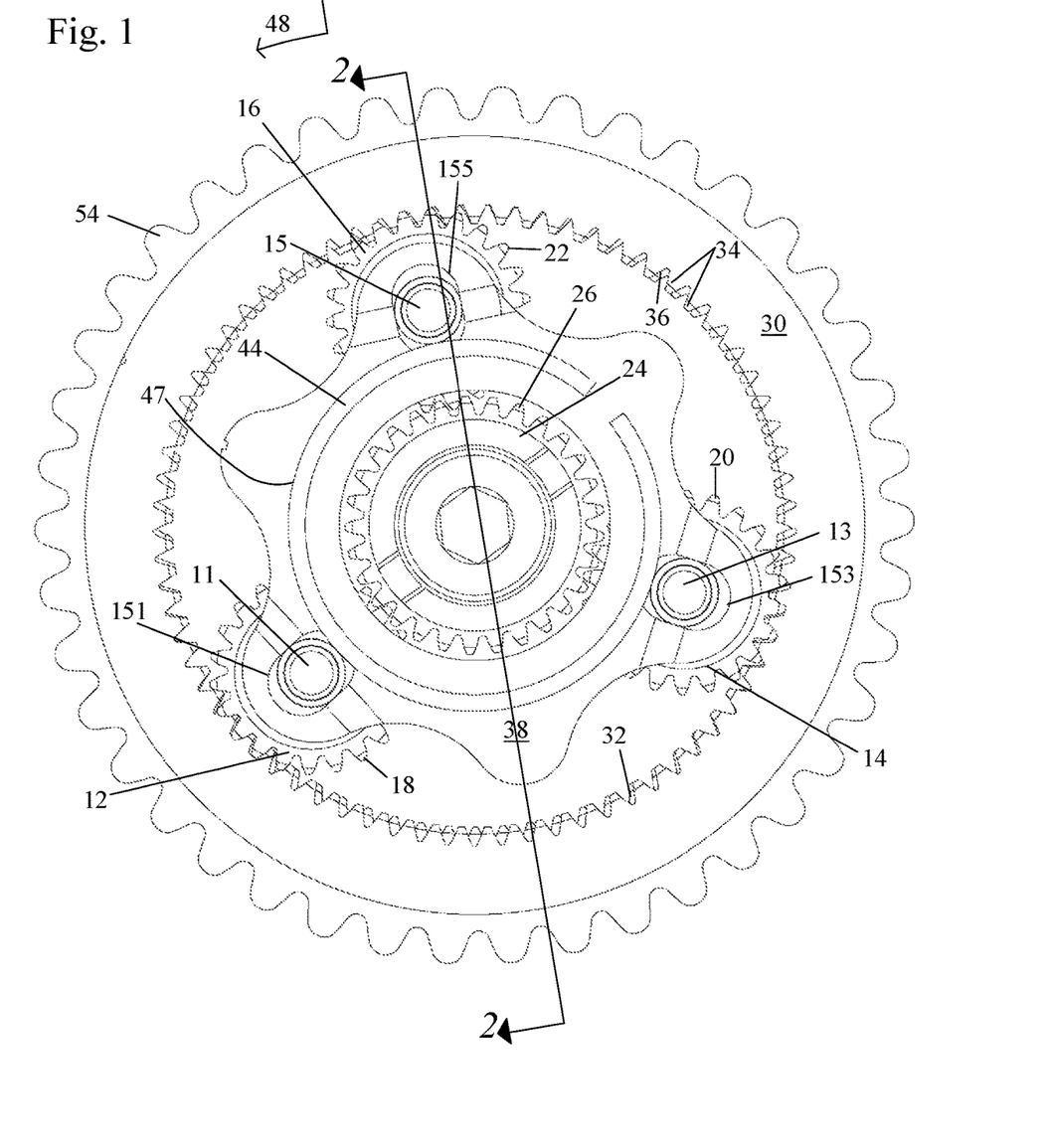
FIG. 1 shows a front view of a planet carrier with slots, planet gears, sun gear, and spring adjacent the planet carrier of a first embodiment.

FIG. 1 shows a split ring gear planetary drive 10 which includes planet gears 12, 14, 16 with planet gear teeth 18, 20, 22, a centrally located sun gear 24 with sun gear teeth 26, and a split ring gear including a sprocket ring gear 30 and a camshaft ring gear 32. The ring gears 30, 32 have different numbers of teeth 34, 36, where the difference in the number of teeth is a multiple of the number of planet gears 12, 14, 16. The ring gear teeth 34, 36 have profiles to allow the ring gears 30, 32 to mesh properly with the planet gears 12, 14, 16. The planet gears 12, 14, 16 are maintained in a fixed relationship to each other by a planetary carrier 38. The planet carrier 38 has slots 151, 153, 155 that receive pins 11, 13, 15 which couple the planetary gears 12, 14, 16 to the planet carrier 38. Planetary gears 12, 14, 16 rotate on pins 11, 13, 15. The pins 11, 13, 15 are moveable in a radial direction 46 within the slots 151, 153, 155.

At least one spring 44 biases the pins 11, 13, 15 within the slots 151, 153, 155 in a radial direction 46 within the slots 151, 153, 155, such that the teeth 18, 20, 22 of the planetary gears 12, 14, 16 are biased toward the teeth of the ring gears 34, 36, reducing the backlash between the planet gears 12, 14, 16 and the sprocket ring gear 30 and the planet gears 12, 14, 16 and the camshaft ring gear 32.

The spring 44 is preferably C-shaped. The outer circumference 47 of the spring 44 contacts and biases all three planetary gears 12, 14, 16 through pins 11, 13, 15 in which the planetary gears 12, 14, 16 rotate on.

Figure 3:
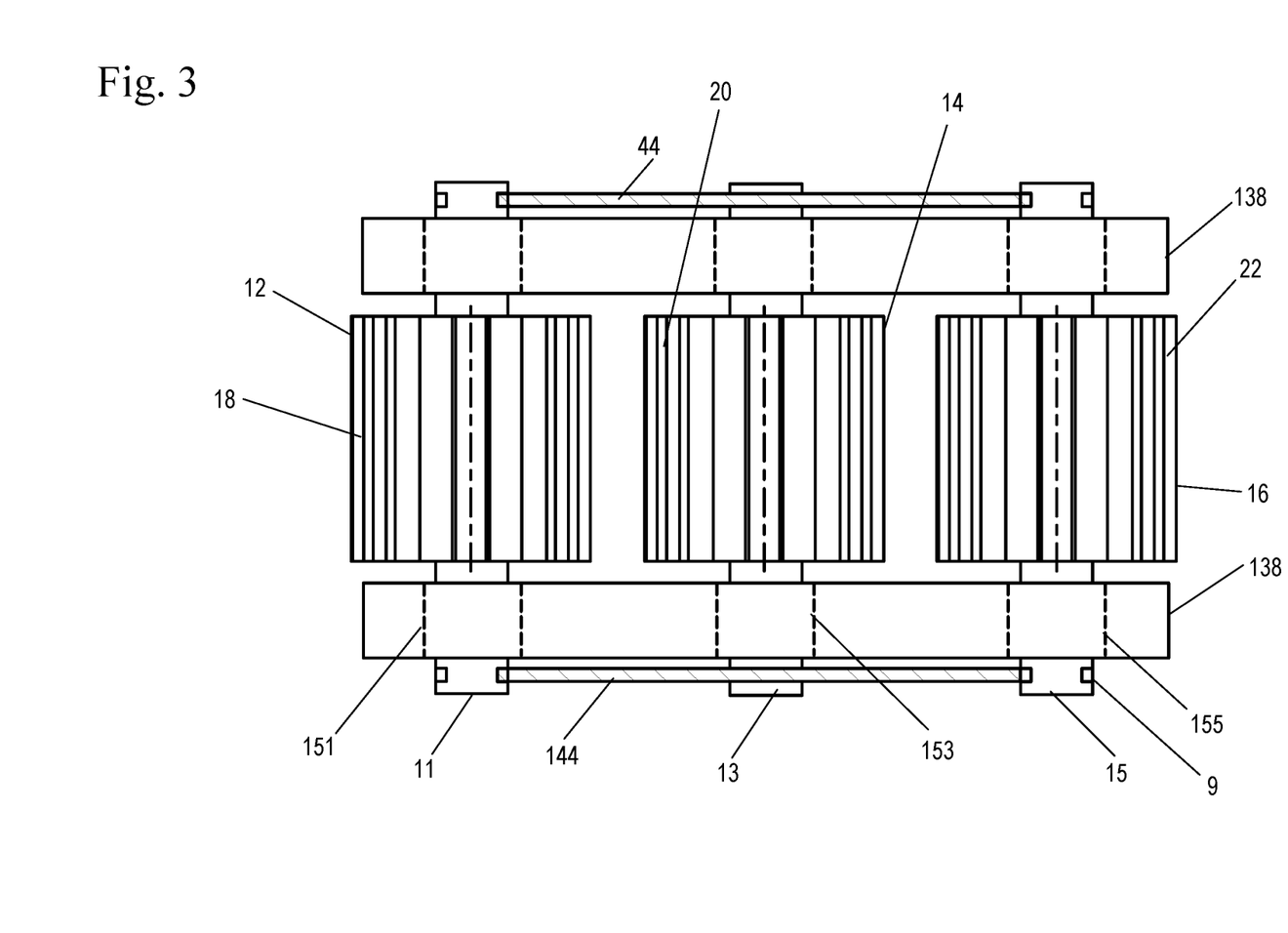
FIG. 3 shows a sectional view of the planet carrier with slots, planet gears, sun gear, and spring of the first embodiment.

A second spring 144 may be present as shown in FIG. 3, such that biasing force from a spring 44, 144 is present on both ends of the pins 11, 13, 15 which couple the planetary gears 12, 14, 16 to the planet carrier 38. The springs 44, 144 are adjacent an outer surface of the planet carrier 38. The outer circumference 47, 147 of the springs 44, 144 contacts and biases all three planetary gears 12, 14, 16 through pins 11, 13, 15 in which the planetary gears 12, 14, 16 rotate on. The outer circumference 47, 147 of the springs 44, 144 may be received in notches 9 of the pins 11, 13, 15.

Figure 2:
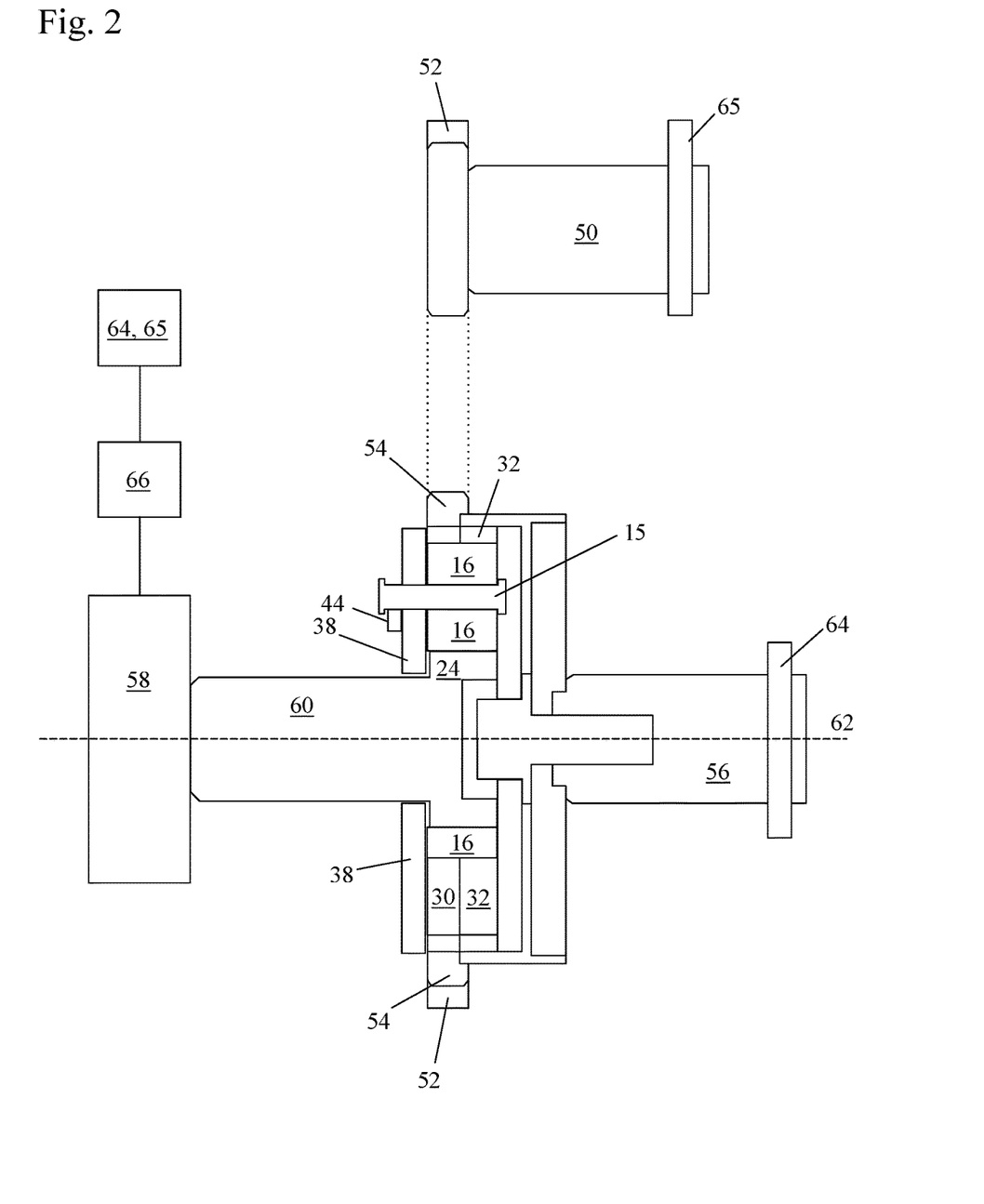
FIG. 2 shows a schematic of an electric phaser including a cross-sectional view of the planetary drive system of FIG. 1 along line 2-2.

Referring to FIG. 2, an engine crankshaft 50 is rotationally engaged through a timing chain 52 to the sprocket ring gear 30 through a sprocket 54, and the engine camshaft 56 is rotationally engaged to the camshaft ring gear 32. An electric motor 58 is rotationally engaged with the sun gear 24 by way of an output shaft 60. When the sun gear 24 is rotated by the electric motor 58 around its axis 62 at the same speed as either of the ring gears 30, 32, since both ring gears 30, 32 rotate in unison, a constant cam phase position is maintained. When the sun gear 24 is driven at a different speed from the ring gears 30, 32 by the electric motor 58, a slightly different speed of one ring gear to the other ring gear causes a cam phase shift function. In this way, a very high numerical ratio is obtained and the camshaft 56 is phased either plus or minus from the nominal rotational relationship of the crankshaft 50 to the camshaft 56.

The cam phaser is preferably used to dynamically adjust the rotational relationship of the camshaft 56 to the engine crankshaft 50 to improve the fuel efficiency of the engine. Sensors 64, 65, one on the crankshaft 50 and one on the camshaft 56 are preferably used as feedback to a motor controller 66 to measure the current position of the camshaft 56 relative to the crankshaft 50 to determine what adjustment, if any, is desired at any point in time to achieve optimal engine efficiency.

Figure 4:
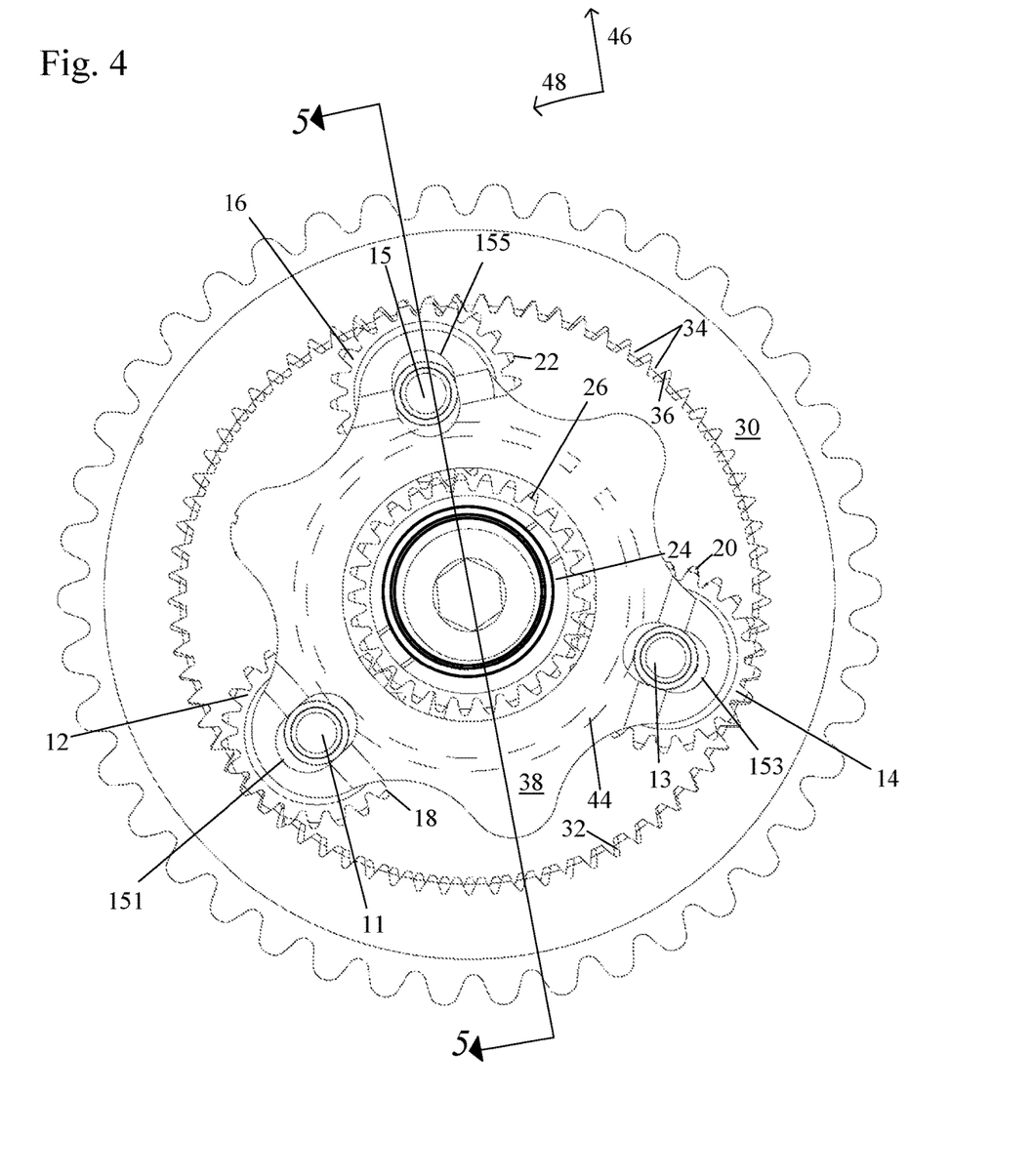
FIG. 4 shows a front view of a planet carrier with slots, planet gears, sun gear and a spring between the planet carrier and the planet gears of a second embodiment.
Figure 5:
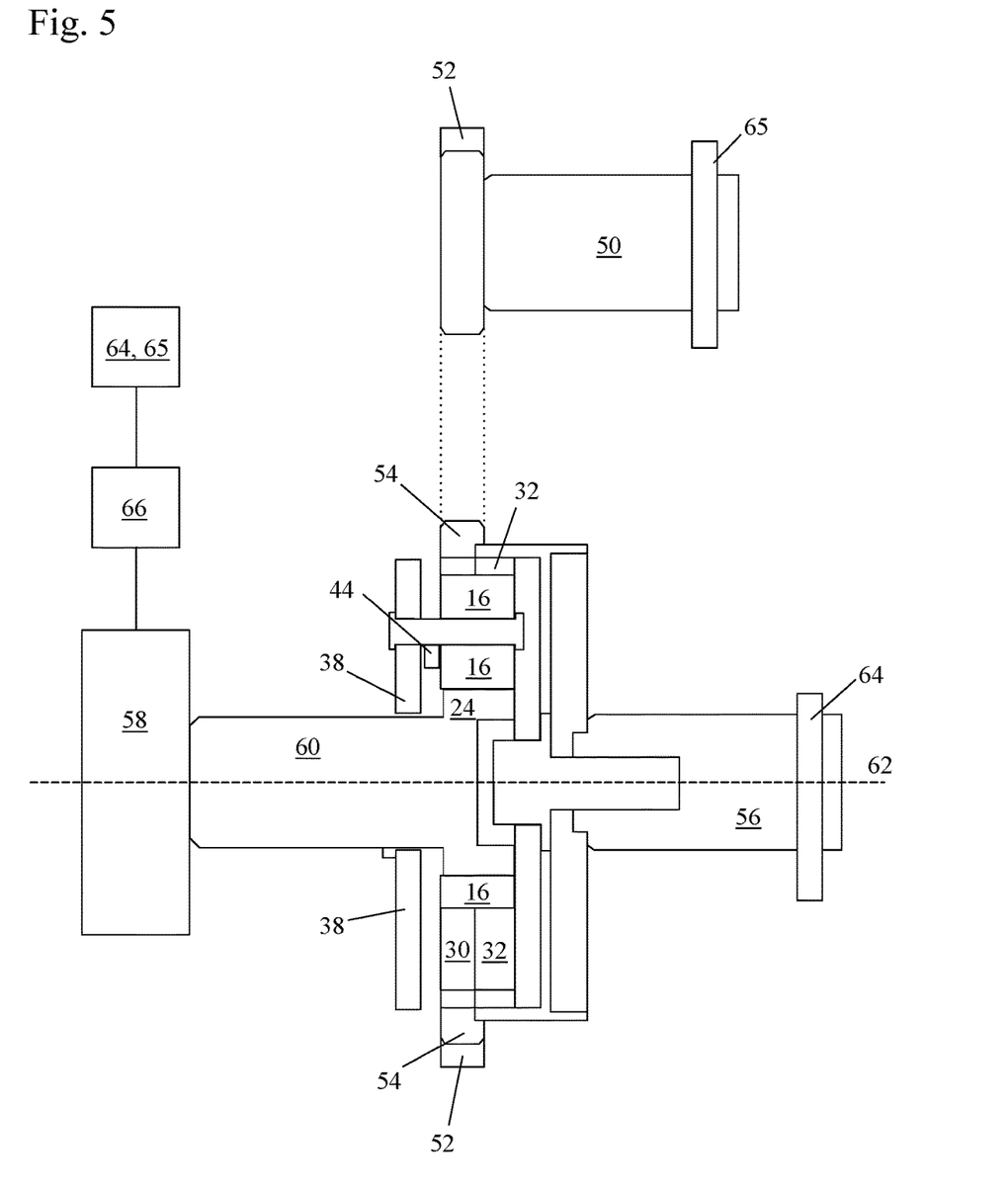
FIG. 5 shows a schematic of an electric phaser including a cross-sectional view of the planetary drive system of FIG. 4 along line 5-5.
Figure 6:
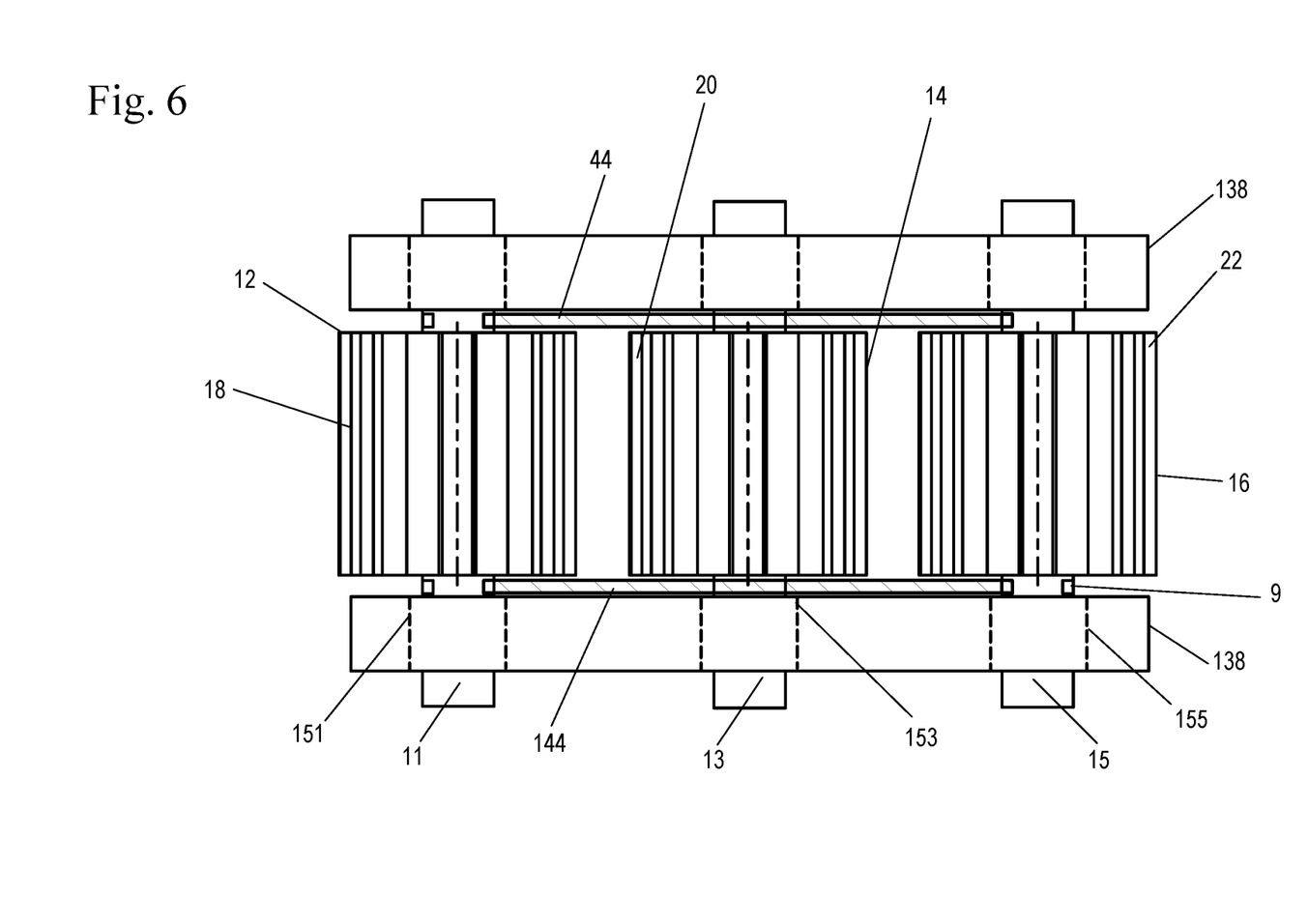
FIG. 6 shows a sectional view of the planet carrier with slots, planet gears, sun gear and spring of the second embodiment.

FIGS. 4-6 show an alternate placement of the at least one spring 44. In FIGS. 4-6, at least one spring 44 is present between the planet carrier 38 and the planet gears 12, 14, 16 instead of adjacent only the planet carrier 38. The planet carrier 38 has slots 151, 153, 155 that receive pins 11, 13, 15 which couple the planetary gears 12, 14, 16 to the planet carrier 138. The pins 11, 13, 15 are moveable in a circumferential direction 48 within the slots 151, 153, 155. Planetary gears 12, 14, 16 rotate on pins 11, 13, 15. At least one spring 44 biases the pins 11, 13, 15 within the slots 151, 153, 155 in a circumferential direction 48 within the slots 151, 153, 155, such that the teeth 18, 20, 22 of the planetary gears 12, 14, 16 are biased toward the teeth of the ring gears 34, 36, eliminating the backlash between the planet gears 12, 14, 16 and the ring gears 30, 32. A second spring 144 may be present as shown in FIG. 6, such that biasing force from a spring 44, 144 is present near both ends of the pins 11, 13, 15 which couple the planetary gears 12, 14, 16 to the planet carrier 38. The outer circumference 47, 147 of the springs 44, 144 contacts and biases all three planetary gears 12, 14, 16 through pins 11, 13, 15 in which the planetary gears 12, 14, 16 rotate on.

Referring to FIG. 5, an engine crankshaft 50 is rotationally engaged through a timing chain 52 to the sprocket ring gear 30 through a sprocket 54, and the engine camshaft 56 is rotationally engaged to the camshaft ring gear 32. An electric motor 58 is rotationally engaged with the sun gear 24 by way of an output shaft 60. When the sun gear 24 is rotated by the electric motor 58 around its axis 62 at the same speed as either of the ring gears 30, 32, since both ring gears 30, 32 rotate in unison, a constant cam phase position is maintained. When the sun gear 24 is driven at a different speed from the ring gears 30, 32 by the electric motor 58, a slightly different speed of one ring gear to the other ring gear causes a cam phase shift function. In this way, a very high numerical ratio is obtained and the camshaft 56 is phased either plus or minus from the nominal rotational relationship of the crankshaft 50 to the camshaft 56.

The cam phaser is preferably used to dynamically adjust the rotational relationship of the camshaft 56 to the engine crankshaft 50 to improve the fuel efficiency of the engine. Sensors 64, 65, one on the crankshaft 50 and one on the camshaft 56 are preferably used as feedback to a motor controller 66 to measure the current position of the camshaft 56 relative to the crankshaft 50 to determine what adjustment, if any, is desired at any point in time to achieve optimal engine efficiency.

Figure 7:
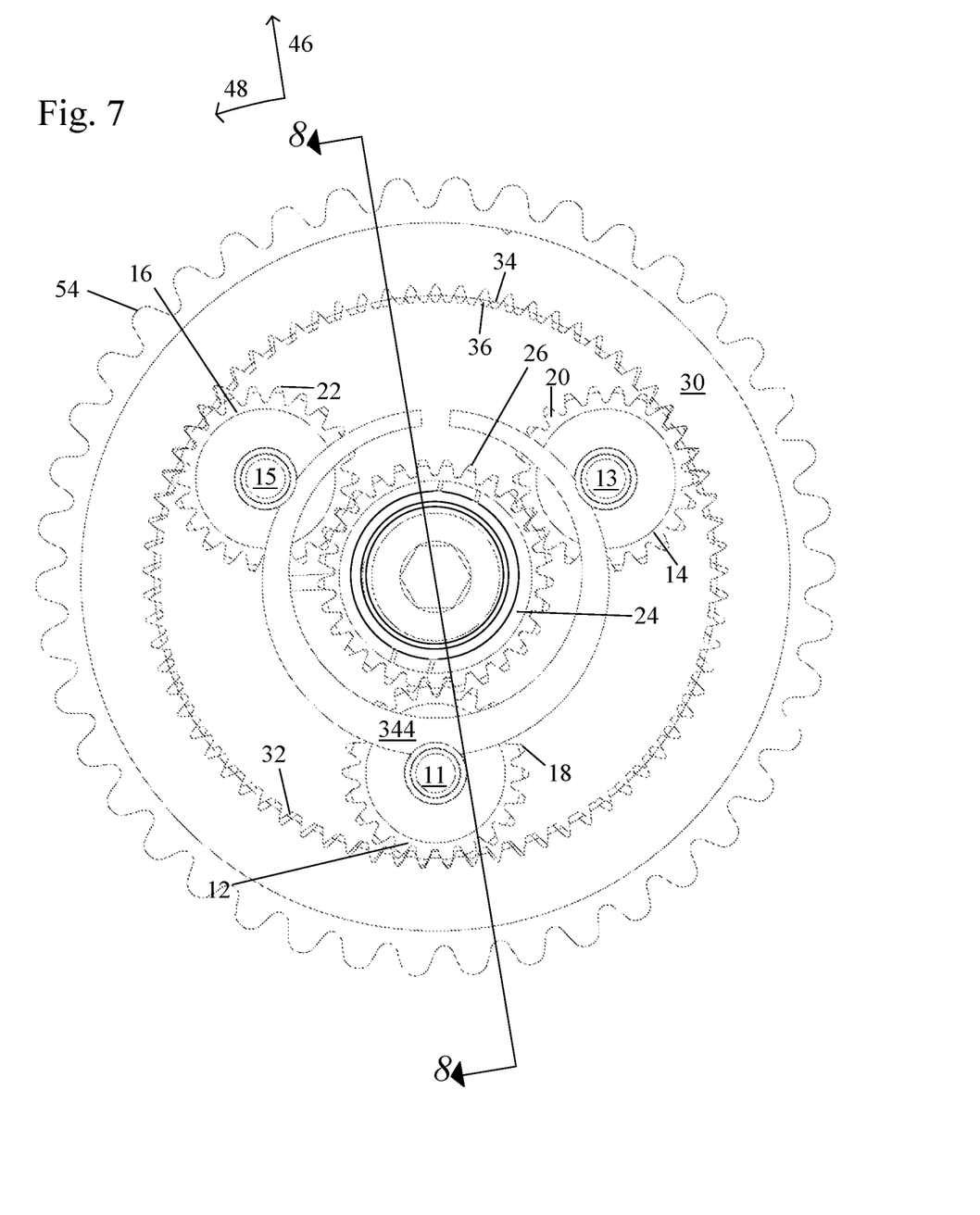
FIG. 7 shows a perspective view of a planetary drive system of a third embodiment.
Figure 8:
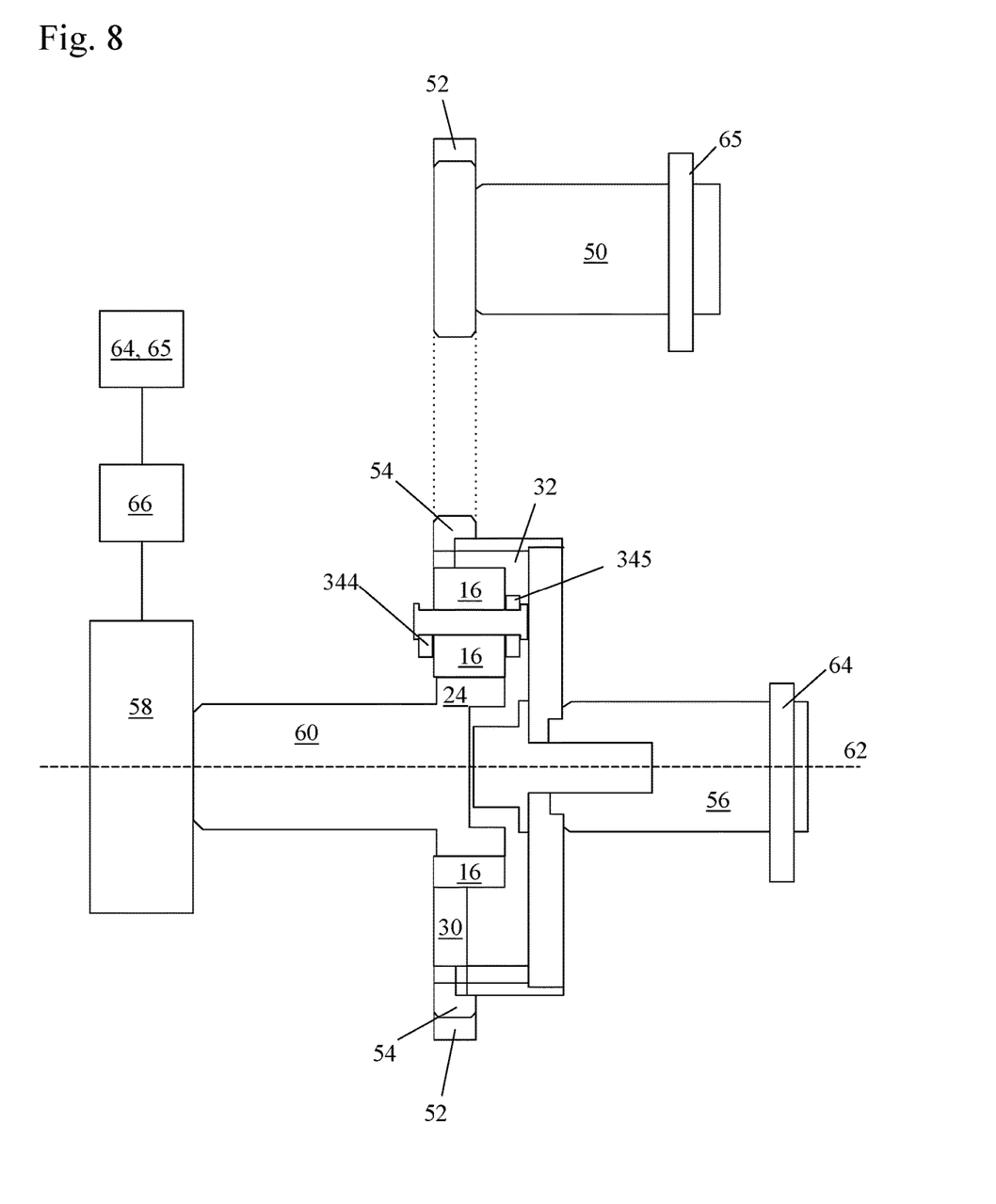
FIG. 8 shows a schematic of an electric phaser including a cross-sectional view of the planetary drive system of FIG. 7 along line 8-8.

FIGS. 7-8 show an alternate split ring gear planetary drive 310 which includes planet gears 12, 14, 16 with planet gear teeth 18, 20, 22, a centrally located sun gear 24 with sun gear teeth 26, and a split ring gear including a sprocket ring gear 30 and a camshaft ring gear 32. The ring gears 30, 32 have different numbers of teeth 34, 36, where the difference in the number of teeth is a multiple of the number of planet gears 12, 14, 16. The ring gear teeth 34, 36 have profiles to allow the ring gears 30, 32 to mesh properly with the planet gears 12, 14, 16. The planet gears 12, 14, 16 are maintained in a relationship to each other by at least a first spring 344. The first spring 344 is preferably C-shaped and may be a snap ring or C-clip. The outer circumference 347 of the spring 344 contacts and biases all three planetary gears 12, 14, 16 through pins 11, 13, 15 in which the planetary gears 12, 14, 16 rotate on. A second spring 345 may be present on the back side of the planetary drive aligned with the first spring 344 to aid in maintaining the relationship between the planet gears 12, 14, 16.

At least one spring 44 is present to bias the planet gears 12, 14, 16 in a circumferential direction 48 and partially in a radial direction 46, such that the teeth 18, 20, 22 of the planetary gears 12, 14, 16 are biased toward the teeth of the ring gears 34, 36, eliminating the backlash between the planet gears and the sun gear 24. The pins 11, 13, 15 may have caps 70 which provide a surface in which the first spring 344 and/or the second spring 345 can engage the pins.

Referring to FIG. 8, an engine crankshaft 50 is rotationally engaged through a timing chain 52 to the sprocket ring gear 30 through a sprocket 54, and the engine camshaft 56 is rotationally engaged to the camshaft ring gear 32. An electric motor 58 is rotationally engaged with the sun gear 24 by way of an output shaft 60. When the sun gear 24 is rotated by the electric motor 58 around its axis 62 at the same speed as either of the ring gears 30, 32, since both ring gears 30, 32 rotate in unison, a constant cam phase position is maintained. When the sun gear 24 is driven at a different speed from the ring gears 30, 32 by the electric motor 58, a slightly different speed of one ring gear to the other ring gear causes a cam phase shift function. In this way, a very high numerical ratio is obtained and the camshaft 56 is phased either plus or minus from the nominal rotational relationship of the crankshaft 50 to the camshaft 56.

The cam phaser is preferably used to dynamically adjust the rotational relationship of the camshaft 56 to the engine crankshaft 50 to improve the fuel efficiency of the engine.

Sensors 64, 65, one on the crankshaft 50 and one on the camshaft 56 are preferably used as feedback to a motor controller 66 to measure the current position of the camshaft 56 relative to the crankshaft 50 to determine what adjustment, if any, is desired at any point in time to achieve optimal engine efficiency.

Figure 12:
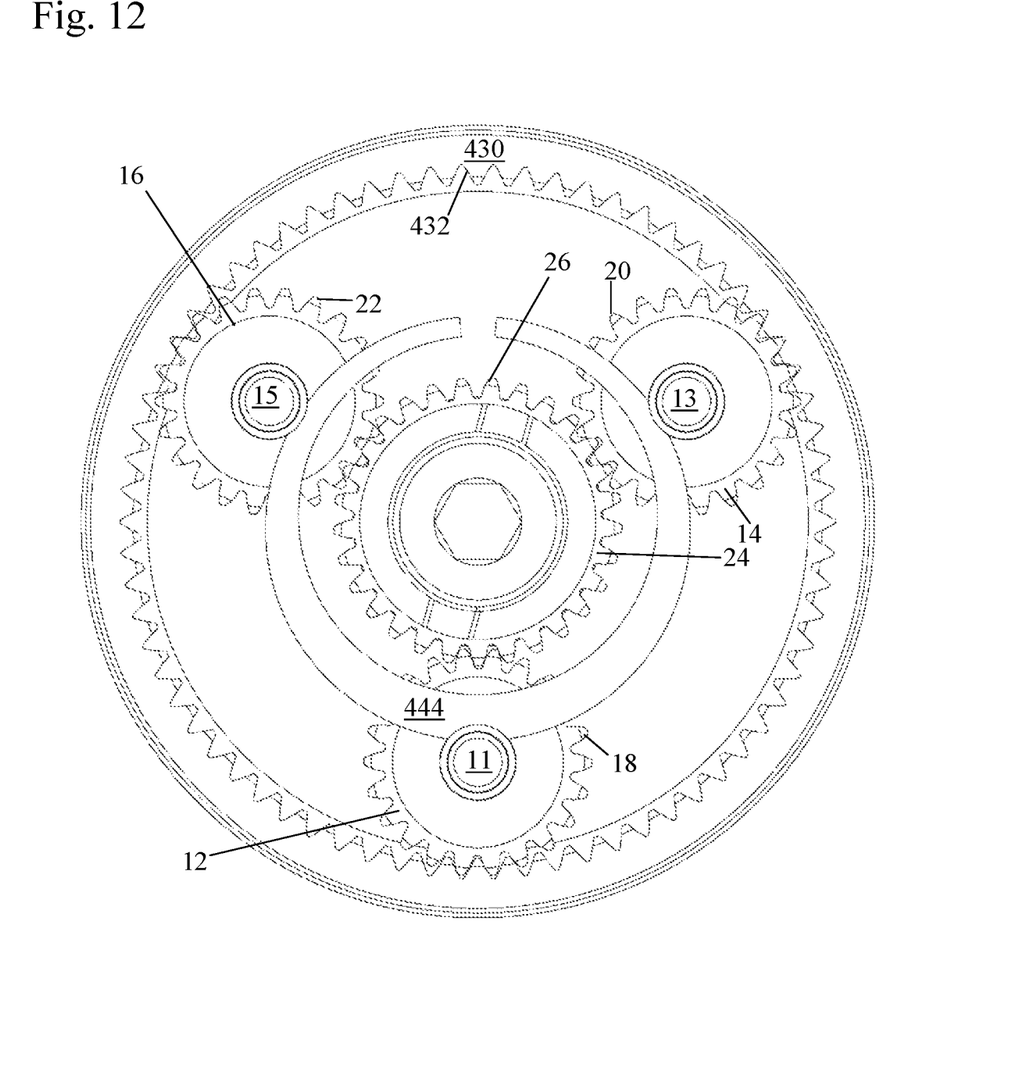
FIG. 12 shows a schematic of a planetary drive with a single ring gear and spring loaded planets of a fourth embodiment.

FIG. 12 shows a single ring planetary drive which includes planet gears 12, 14, 16 with planet gear teeth 18, 20, 22, a centrally located sun gear 24 with sun gear teeth 26, and a single ring gear 430. The ring gear 430 has a plurality of ring gear teeth 434 maintaining the ring gear 430 in meshing engagement with the planet gear teeth 18, 20, 22 of each of the planet gears 12, 14, 16.

The planet gears 12, 14, 16 are maintained in a relationship to each other by at least a first spring 444. The first spring 444 biases the planet gear teeth 18, 20, 22 of the planetary gears 12, 14, 16 into meshing engagement with the ring gear teeth 434 of the ring gear 430. The first spring 444 is preferably C-shaped and may be a snap ring or C-clip. The outer circumference 447 of the spring 444 contacts and biases all three planetary gears 12, 14, 16 through pins 11, 13, 15 in which the planetary gears 12, 14, 16 rotate on. A second spring (not shown) may be present on the back side of the planetary drive aligned with the first spring 444 to aid in maintaining the relationship between the planet gears 12, 14, 16. When the sun gear 24 is rotated, the planet gears 12, 14, 16 are rotated relative to the ring gear 430. The spring 444 reduces the gear backlash between the planet gear teeth 18, 20, 22 and the ring gear teeth 434.

Figures 9, 10, 11:
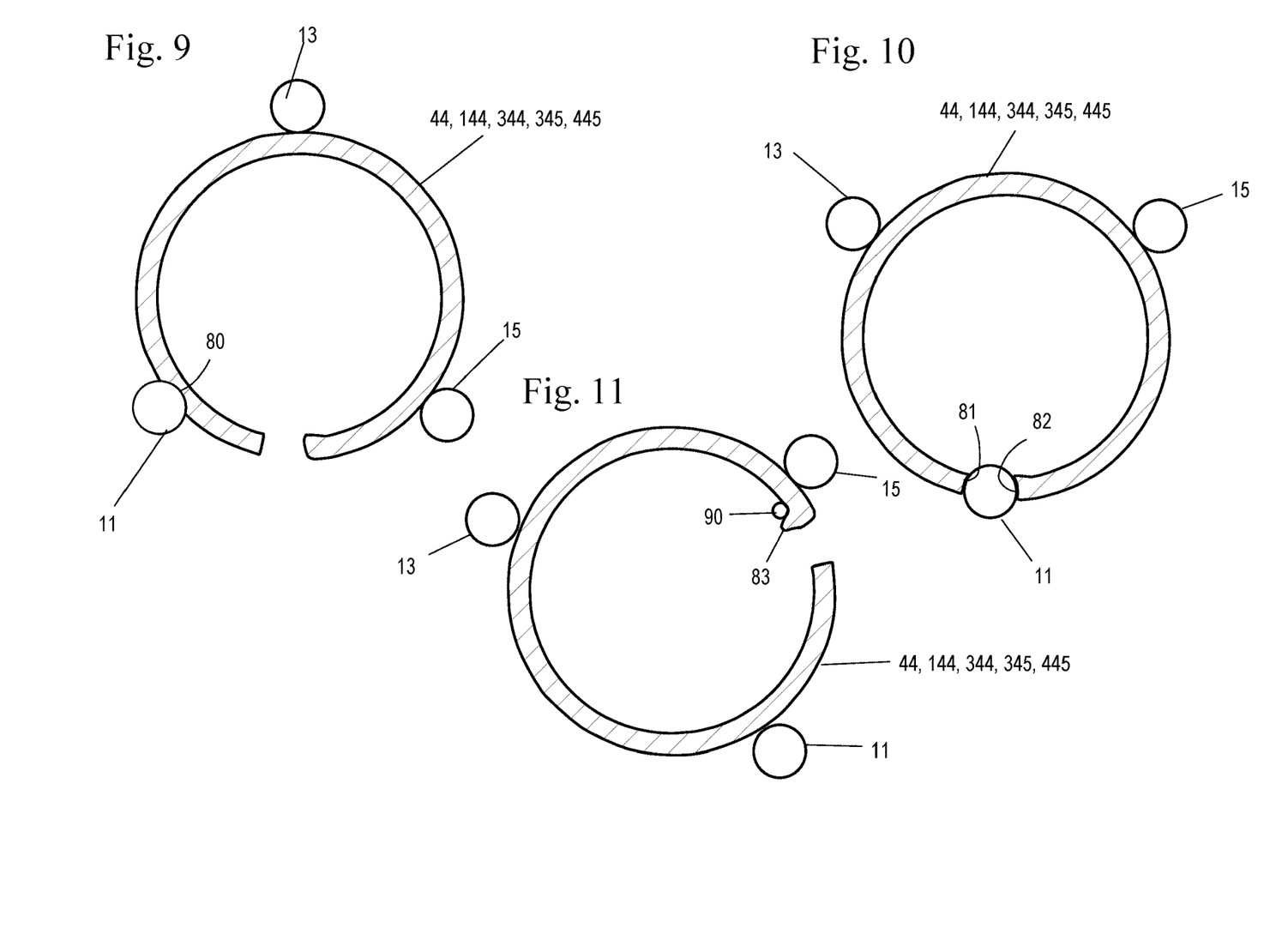
FIG. 9 shows preventing rotation of a spring through notches.
FIG. 10 shows preventing rotation of a spring by aligning the ends of the spring to abut a pin.
FIG. 11 shows preventing rotation of a spring through the engagement of a hook end of the spring with an additional pin.

The spring 44, 144, 344, 345, 445 in any of the above embodiments may be prevented from rotation through rotation preventers. The rotation preventer may be a notch 80 formed near an end of the C-shaped spring which can receive a pin 11 coupled to a planet gear 12 as shown in FIG. 9. The other pins 13, 15, which are coupled to the other planets 14, 16 are used to maintain the spring in place.

In an alternate embodiment as shown in FIG. 10, the ends 81, 82 of the C-shaped spring 44, 144, 344, 345, 445 may be placed on opposite sides of a pin 11 coupled to a planet gear 12, limiting rotation of the spring relative to the pins 13, 15. The other pins 13, 15, which are coupled to the other planets 14, 16 of the split ring gear planetary drive may be used to maintain the spring in place.

In yet another embodiment, as shown in FIG. 11, at least one ends 83 of the spring 44, 144, 344, 345, 445 may be hook shaped. An additional pin 90 may be placed relative to the hooked end 83 preventing rotation of the spring. While the pin 11 was used as the pin which was received by the notch 80 and placed between the ends 83, 84 of the spring, the other pins 13, 15 may be used instead of pin 11.

It should be noted that using a c-clip spring or snap ring is easy to install on the split ring planetary gear drive or single ring planetary gear drive as the spring can be squeezed together, inserted where needed and then released into place.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. An electric phaser for dynamically adjusting a rotational relationship of a camshaft of an internal combustion engine with respect to an engine crankshaft, the electric phaser comprising:
   an electric motor; and
   a split ring planetary drive comprising:
   a sun gear coupled to the electric motor for rotation around a sun axis by the electric motor, the sun gear comprising a plurality of sun gear teeth;
   a plurality of planet gears arranged around the sun gear, each planet gear comprising a plurality of planet teeth maintaining the planet gear in meshing engagement with the sun gear teeth, and rotatable about a pin;
   a sprocket ring gear driven by the engine crankshaft, the sprocket ring gear comprising a plurality of sprocket ring gear teeth maintaining the sprocket ring gear in meshing engagement with the planet gear teeth of each of the planet gears;
   a camshaft ring gear rotatable with the camshaft, the camshaft ring gear comprising a plurality of camshaft ring gear teeth maintaining the camshaft ring gear in meshing engagement with the planet gear teeth of each of the planet gears;
   a planet carrier rotatable with the plurality of planet gears and connected to the planetary gears through pins, the pins being free to move radially with respect to the planet carrier; and
   at least one spring, biasing the plurality of planet teeth into meshing engagement with the sprocket ring gear teeth and the camshaft ring gear teeth.

2. The electric phaser of claim 1, wherein the planet carrier further comprises radially extending slots for receiving the pins, the pins being radially moveable within the slots, the planet carrier coupled to the plurality of planet gears through pins, wherein each of the planet gears are rotatable about a pin.

3. The electric phaser of claim 2, wherein the at least one spring is received between the planet carrier and the plurality of planet gears.

4. The electric phaser of claim 2, wherein the at least one spring is adjacent the planet carrier.

5. The electric phaser of claim 1, wherein the spring is C-shaped had has a first end, a second end and an outer circumference and the outer circumference of the spring contacts at least one of the pins associated with each of the planetary gears.

6. The electric phaser of claim 1, wherein the spring is C-shaped and has a first end, a second end and an outer circumference and comprises a notch near the first end or second end for receiving a pin on which the planetary gear rotates.

7. The electric phaser of claim 1, wherein the spring is C-shaped had has a first end, a second end and an outer circumference and the first end and the second ends both surround a pin associated with at least one of the plurality of planetary gears.

8. An electric phaser for dynamically adjusting a rotational relationship of a camshaft of an internal combustion engine with respect to an engine crankshaft, the electric phaser comprising:
   an electric motor; and
   a split ring planetary drive comprising:
   a sun gear coupled to the electric motor for rotation around a sun axis by the electric motor, the sun gear comprising a plurality of sun gear teeth;
   a plurality of planet gears arranged around the sun gear, each planet gear comprising a plurality of planet teeth maintaining the planet gear in meshing engagement with the sun gear teeth, and rotatable about a pin;
   a sprocket ring gear driven by the engine crankshaft, the sprocket ring gear comprising a plurality of sprocket ring gear teeth maintaining the sprocket ring gear in meshing engagement with the planet gear teeth of each of the planet gears;

a camshaft ring gear rotatable with the camshaft, the camshaft ring gear comprising a plurality of camshaft ring gear teeth maintaining the camshaft ring gear in meshing engagement with the planet gear teeth of each of the planet gears;

a planet carrier rotatable with the plurality of planet gears and connected to the planetary gears through pins; and at least one spring, biasing the plurality of planet teeth into meshing engagement with the sprocket ring gear teeth and the camshaft ring gear teeth, wherein the spring is C-shaped and has a first end, a second end and an outer circumference and comprises a notch near the first end or second end for receiving a pin on which the planetary gear rotates.

* * * * *